US011451749B2

(12) United States Patent
Yoshii et al.

(10) Patent No.: US 11,451,749 B2
(45) Date of Patent: Sep. 20, 2022

(54) DISPLAY CONTROL DEVICE AND DISPLAY CONTROL METHOD, DISPLAY DEVICE, AND MOVING BODY DEVICE

(71) Applicant: SONY CORPORATION, Tokyo (JP)

(72) Inventors: Kazuma Yoshii, Tokyo (JP); Yoshinori Nasada, Kanagawa (JP); Koji Nagata, Tokyo (JP); Takehiko Tahira, Kanagawa (JP); Sho Tanaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 120 days.

(21) Appl. No.: 16/943,160

(22) Filed: Jul. 30, 2020

(65) Prior Publication Data

US 2020/0358986 A1    Nov. 12, 2020

Related U.S. Application Data

(63) Continuation of application No. 16/301,660, filed as application No. PCT/JP2017/017095 on Apr. 28, 2017, now Pat. No. 10,757,375.

(30) Foreign Application Priority Data

Jun. 2, 2016    (JP) .................................. 2016-110877

(51) Int. Cl.
*H04N 7/18* (2006.01)
*H04N 5/272* (2006.01)
(Continued)

(52) U.S. Cl.
CPC ............... *H04N 7/183* (2013.01); *B60R 1/00* (2013.01); *B60R 21/00* (2013.01);
(Continued)

(58) Field of Classification Search
CPC ..... B60R 1/00; B60R 21/00; B60R 2300/205; G02B 2027/0138; G02B 27/0101;
(Continued)

(56) References Cited

U.S. PATENT DOCUMENTS 10,179,544 B2 *    1/2019    Endo .................... H04N 5/2258
10,486,599 B2 *    11/2019    Baur ......................... B60R 1/00
(Continued)

FOREIGN PATENT DOCUMENTS

EP          1916645 A1    4/2008
JP       2004-020223 A    1/2004
(Continued)

OTHER PUBLICATIONS

Office Action in JP 2018-520736 dated Oct. 15, 2018.
(Continued)

*Primary Examiner* — Joon Kwon
(74) *Attorney, Agent, or Firm* — Chip Law Group (57) ABSTRACT

A display control device includes a detection unit that detects a condition of a moving body and a control unit that controls a display mode of a display unit having a transmissive mode in which a landscape outside the moving body is displayed on at least a part of a display screen, on the basis of a detection result of the detection unit. The display unit has the transmissive mode and a non-transmissive mode in which a content movie is displayed by superimposing the content movie onto at least a part of the landscape outside the moving body or on the entire display screen, and the control unit sets the display unit to either the transmissive mode or the non-transmissive mode according to a detection result of the detection unit.

11 Claims, 6 Drawing Sheets

(51) Int. Cl.
| | |
|---|---|
| *G02B 27/01* | (2006.01) |
| *B60R 1/00* | (2022.01) |
| *H04N 5/66* | (2006.01) |
| *G09G 5/36* | (2006.01) |
| *B60R 21/00* | (2006.01) |
| *H04N 5/74* | (2006.01) |
| *G09G 5/377* | (2006.01) |
| *G05D 1/02* | (2020.01) |

(52) U.S. Cl.
CPC ........... *G02B 27/0101* (2013.01); *G09G 5/36* (2013.01); *H04N 5/272* (2013.01); *H04N 5/66* (2013.01); *H04N 5/74* (2013.01); *H04N 7/18* (2013.01); *B60R 2300/205* (2013.01); *G02B 2027/0138* (2013.01); *G05D 1/021* (2013.01); *G05D 2201/0213* (2013.01); *G09G 5/377* (2013.01); *G09G 2300/0456* (2013.01); *G09G 2380/10* (2013.01)

(58) Field of Classification Search
CPC ........... G05D 1/021; G05D 2201/0213; G09G 2300/0456; G09G 2380/10; G09G 5/36; G09G 5/377; H04N 5/272; H04N 5/66; H04N 5/74; H04N 7/18; H04N 7/183
See application file for complete search history.

(56) References Cited

U.S. PATENT DOCUMENTS

| | | | | |
|---|---|---|---|---|
| 10,506,178 | B2* | 12/2019 | Tsutsumitake | H04N 5/2171 |
| 10,509,413 | B2* | 12/2019 | Mou | G06V 20/56 |
| 10,518,702 | B2* | 12/2019 | Al Rasheed | H04N 7/18 |
| 10,796,507 | B2* | 10/2020 | Motomura | G07C 5/0825 |
| 10,834,323 | B2* | 11/2020 | Shiohara | H04N 5/2253 |
| 10,919,450 | B2* | 2/2021 | Seki | G06V 20/58 |
| 11,117,472 | B2* | 9/2021 | Fukushima | B62D 15/027 |
| 11,153,484 | B2* | 10/2021 | Iino | G06V 20/58 |
| 2009/0069974 | A1* | 3/2009 | Kawase | B60R 1/00 701/36 |
| 2009/0261957 | A1 | 10/2009 | Kido | |
| 2011/0291824 | A1* | 12/2011 | Kido | B60K 35/00 340/435 |
| 2012/0212613 | A1* | 8/2012 | Yamaguchi | B60R 1/00 348/148 |
| 2013/0235351 | A1* | 9/2013 | Sachdev | B60R 1/00 353/13 |
| 2013/0329005 | A1* | 12/2013 | Shih | B60R 1/00 348/36 |
| 2014/0107888 | A1* | 4/2014 | Quast | B60R 1/00 701/36 |
| 2014/0309864 | A1* | 10/2014 | Ricci | G09G 5/37 701/36 |
| 2016/0035138 | A1* | 2/2016 | Kim | G06T 1/20 345/633 |
| 2016/0350974 | A1* | 12/2016 | Hashimoto | H04N 7/181 |

FOREIGN PATENT DOCUMENTS

| | | |
|---|---|---|
| JP | 2005-184225 A | 7/2005 |
| JP | 3887655 B1 | 2/2007 |
| JP | 2007-052719 A | 3/2007 |
| JP | 2007-326526 A | 12/2007 |
| JP | 2008-189202 A | 8/2008 |
| JP | 2010-006092 A | 1/2010 |
| JP | 2010-532287 A | 10/2010 |
| JP | 2011-181110 A | 9/2011 |
| JP | 2015-024746 A | 2/2015 |
| JP | 2016-053622 A | 4/2016 |
| WO | 2007/020840 A1 | 2/2007 |
| WO | 2008/093983 A1 | 8/2008 |

OTHER PUBLICATIONS

International Search Report and Written Opinion of PCT Application No. PCT/JP2017/017095, dated Jul. 25, 2017, 14 pages of English translation and 11 pages of ISRWO.

International Preliminary Report on Patentability of PCT Application No. PCT/JP2017/017095, dated Dec. 13, 2018, 14 pages of English translation and 08 pages of IPRP.

Non-Final Office Action for U.S. Appl. No. 16/301,660, dated Jul. 29, 2019, 14 pages.

Final Office Action for U.S. Appl. No. 16/301,660, dated Feb. 7, 2020, 12 pages.

Notice of Allowance for U.S. Appl. No. 16/301,660, dated Apr. 22, 2020, 09 pages.

Office Action for JP Patent Application No. 2018-520736, dated Jun. 22, 2021, 08 pages of Office Action and 08 pages of English Translation.

* cited by examiner

DISPLAY CONTROL DEVICE AND DISPLAY CONTROL METHOD, DISPLAY DEVICE, AND MOVING BODY DEVICE

CROSS REFERENCE TO RELATED APPLICATIONS

This application is continuation application of U.S. patent application Ser. No. 16/301,660, filed on Nov. 14, 2018, which is a U.S. National Phase of International Patent Application No. PCT/JP2017/017095 filed on Apr. 28, 2017, which claims priority benefit of Japanese Patent Application No. JP 2016-110877 filed in the Japan Patent Office on Jun. 2, 2016. Each of the above-referenced applications is hereby incorporated herein by reference in its entirety.

TECHNICAL FIELD

The technology disclosed in the present description relates to a display control device and a display control method, a display device, and a moving body device that control display of a movie in a closed space and, more particularly, to a display control device and a display control method, a display device, and a moving body device that control display of a movie in a room of a moving body such as a vehicle.

BACKGROUND ART

Research on automated driving for vehicles is under way rapidly (for example, refer to Patent Document 1). In response to further upcoming proliferation of advanced driver assistance system (ADAS), improvement of social infrastructure such as introduction of dedicated traveling lanes and lane sections where driving persons do not need to be involved, and additionally, relaxation of laws and regulations, for example, to permit separation of driving persons from vehicle control, it is expected that vehicles that are fully automatically driven will appear in the public road in the near future.

For passengers of vehicles who are completely separated from vehicle control, the passenger compartment is a space for housing, food, and clothing similar to the living room at home. It is assumed that the passengers read books, operate information terminals such as smartphones, enjoy content such as films on a display installed in the passenger compartment, and make a conversation or a conference with other passengers, almost without being conscious of being in the vehicle.

Simply viewing a movie in the passenger compartment has been already realized. It is common to use an on-board display or a head-up display to view a movie in the passenger compartment. For example, proposals have been made for an in-vehicle image display device that acquires image information associated with a landscape that is supposed to be seen outside the vehicle at the position of the vehicle from an accumulation device to display on a window glass (for example, refer to Patent Document 2). Furthermore, proposals have been made for an in-vehicle image display device that generates image data representing an image around the vehicle on the basis of detection results for conditions around the vehicle (status of surrounding landscapes, surrounding people, other vehicles, obstacles, and the like) and the driving state of the vehicle and displays the generated image data on a display means provided at least on an entire window portion on the front of the vehicle (for example, refer to Patent Document 3).

CITATION LIST

Patent Document

Patent Document 1: Japanese Patent Application Laid-Open No. 2015-24746
Patent Document 2: Japanese Patent Application Laid-Open No. 2004-20223
Patent Document 3: Japanese Patent Application Laid-Open No. 2011-181110

SUMMARY OF THE INVENTION

Problems to be Solved by the Invention

An object of the technology to be disclosed in the present description is to provide a display control device and a display control method, a display device, and a moving body device that display a movie in a room of a moving body such as a vehicle.

Solutions to Problems

The technology disclosed in the present description has been made in consideration of the above-described problems and a first aspect thereof is a display control device including:
a detection unit that detects a condition of a moving body; and
a control unit that controls a display mode of a display unit having a transmissive mode in which a landscape outside the moving body is displayed on at least a part of a display screen, on the basis of a detection result of the detection unit.

According to a second aspect of the technology disclosed in the present description, the display unit has the transmissive mode and a non-transmissive mode in which a content movie is displayed by superimposing the content movie onto at least a part of the landscape outside the moving body or on the entire display screen. Then, the control unit of the display control device according to the first aspect is configured to set the display unit to either the transmissive mode or the non-transmissive mode according to a detection result of the detection unit.

According to a third aspect of the technology disclosed in the present description, in the display control device according to the first aspect, the display unit is configured to display a movie on the display screen constituted by an inner wall surface of the moving body.

According to a fourth aspect of the technology disclosed in the present description, in the display control device according to the first aspect, the moving body is provided with a window. Furthermore, the display unit is configured to display a movie on the display screen constituted by an inner wall surface of the moving body including the window.

According to a fifth aspect of the technology disclosed in the present description, in the display control device according to the fourth aspect, the window is allowed to be opened and closed. Furthermore, the display unit is configured to display, in the transmissive mode, a landscape outside the moving body on at least a part of the display screen by opening the window or including the window and, in the non-transmissive mode, display a content movie by superimposing the content movie onto at least a part of the landscape outside the moving body displayed on the display screen including the window with the window closed or on the entire display screen.

According to a sixth aspect of the technology disclosed in the present description, in the display control device according to the fourth aspect, the window is allowed to be switched between a transmissive state in which light is transmitted and a non-transmissive state in which light is blocked. Furthermore, the display unit is configured to place, in the transmissive mode, the window in the transmissive state such that a landscape outside the moving body is visible and, in the non-transmissive mode, place at least a part of the window in the non-transmissive state such that a content movie is displayed by superimposing the content movie onto at least a part of the landscape outside the moving body or on the entire display screen including the window.

According to a seventh aspect of the technology disclosed in the present description, in the display control device according to the fourth aspect, the display unit includes the window in the display screen, and is configured to display, in the transmissive mode, a movie of a landscape outside the moving body imaged by a camera mounted on the moving body within a frame of the window and, in the non-transmissive mode, display a content movie by superimposing the content movie onto at least a part of an inside area of the frame of the window or on an entire inside area of the frame of the window.

According to an eighth aspect of the technology disclosed in the present description, the detection unit of the display control device according to the first aspect is configured to acquire information associated with a current position of the moving body, and the control unit is configured to switch the display unit from the transmissive mode to the non-transmissive mode or from the non-transmissive mode to the transmissive mode on the basis of the current position of the moving body.

According to a ninth aspect of the technology disclosed in the present description, the detection unit of the display control device according to the first aspect is configured to acquire information associated with conditions inside and outside the moving body or a surrounding environment of the moving body, and the control unit is configured to switch the display unit from the transmissive mode to the non-transmissive mode or from the non-transmissive mode to the transmissive mode on the basis of the condition outside the moving body.

According to a tenth aspect of the technology disclosed in the present description, the control unit of the display control device according to the ninth aspect is configured to switch the display unit to the non-transmissive mode in response to the detection unit having detected that a traffic congestion has occurred.

According to an eleventh aspect of the technology disclosed in the present description, in the display control device according to the seventh aspect, the window is allowed to be opened and closed. Then, the control unit is configured to prohibit opening and closing of the window under the transmissive mode in which a movie captured by a camera mounted on the moving body is displayed within the frame of the window.

According to a twelfth aspect of the technology disclosed in the present description, in the display control device according to the seventh aspect, the window is allowed to be opened and closed. Then, the display unit is configured to adjust display within the frame of the window in conjunction with an opening/closing position of the window under the transmissive mode in which a movie captured by a camera mounted on the moving body is displayed within the frame of the window.

Furthermore, a thirteenth aspect of the technology disclosed in the present description is a display control method including:
a detection step of detecting a condition of a moving body; and
a control step of controlling a display mode of a display unit having a transmissive mode in which a landscape outside the moving body is displayed on at least a part of a display screen.

Furthermore, a fourteenth aspect of the technology disclosed in the present description is a display device including:
a detection unit that detects a condition of a moving body;
a display unit mounted on the moving body and having a transmissive mode in which a landscape outside the moving body is displayed on at least a part of a display screen; and
a control unit that controls a display mode of the display unit on the basis of a detection result of the detection unit.

Furthermore, a fifteenth aspect of the technology disclosed in the present description is a moving body device including:
a moving body;
a display unit having a transmissive mode in which a landscape outside the moving body is displayed on at least a part of a display screen;
a detection unit that detects a condition of the moving body; and
a control unit that controls a display mode of the display unit on the basis of a detection result of the detection unit.

Effects of the Invention

According to the technology disclosed in the present description, it is possible to provide a display control device and a display control method, a display device, and a moving body device that display a movie in a room of a moving body such as a vehicle.

Note that the effects described in the present description merely serve as examples and the effects of the present invention are not construed to be limited thereto. Furthermore, an additional effect other than the aforementioned effects may be further obtained as well in the present invention.

Still another object, feature, and advantage of the technology to be disclosed in the present description will be made clear through more detailed description based on the embodiments mentioned below and the accompanying drawings.

MODE FOR CARRYING OUT THE INVENTION

Hereinafter, embodiments of the technology to be disclosed in the present description will be described in detail with reference to the drawings.

Automated driving can also be defined as a driving mode in which a vehicle autonomously travels to a specified destination while recognizing a surrounding environment of the vehicle using sensing devices such as a radar, light detection and ranging or laser imaging detection and ranging (LIDAR), a global navigation satellite system (GNSS; for example, a global positioning system (GPS)), and an in-vehicle camera. However, in the following description, the strict definition of the automated driving is not of concern. Furthermore, the automated driving may be carried out limitedly on a highway or a dedicated traveling lane or a lane section set on a general road for an automatically driven vehicle. Moreover, although the relaxation of laws and regulations related to driving of automobiles is also necessary in addition to the improvement of social infrastructure to realize the automated driving of vehicles, the following description will be given assuming that these difficulties have been removed.

For drivers and other passengers released from driving operations during a period in which the vehicle performs the automated driving, it is desirable that the passenger compartment be a space allowing comfortable ride and relaxation. It is of course similarly preferable that the passenger compartment be a space allowing comfortable ride and relaxation for passengers even for a vehicle that is under manual driving or a car-for-hire such as a taxi.

As one method of using a vehicle being automatically driven, the present description will make a proposal for utilizing an inner wall surface of the passenger compartment as a full celestial display. The inner wall surface of the passenger compartment of course can be used as a display, not during the automated driving but during manual driving or on a car-for-hire. However, at least the windshield cannot be used as a display for the driving operations of the driver.

Figure 1:
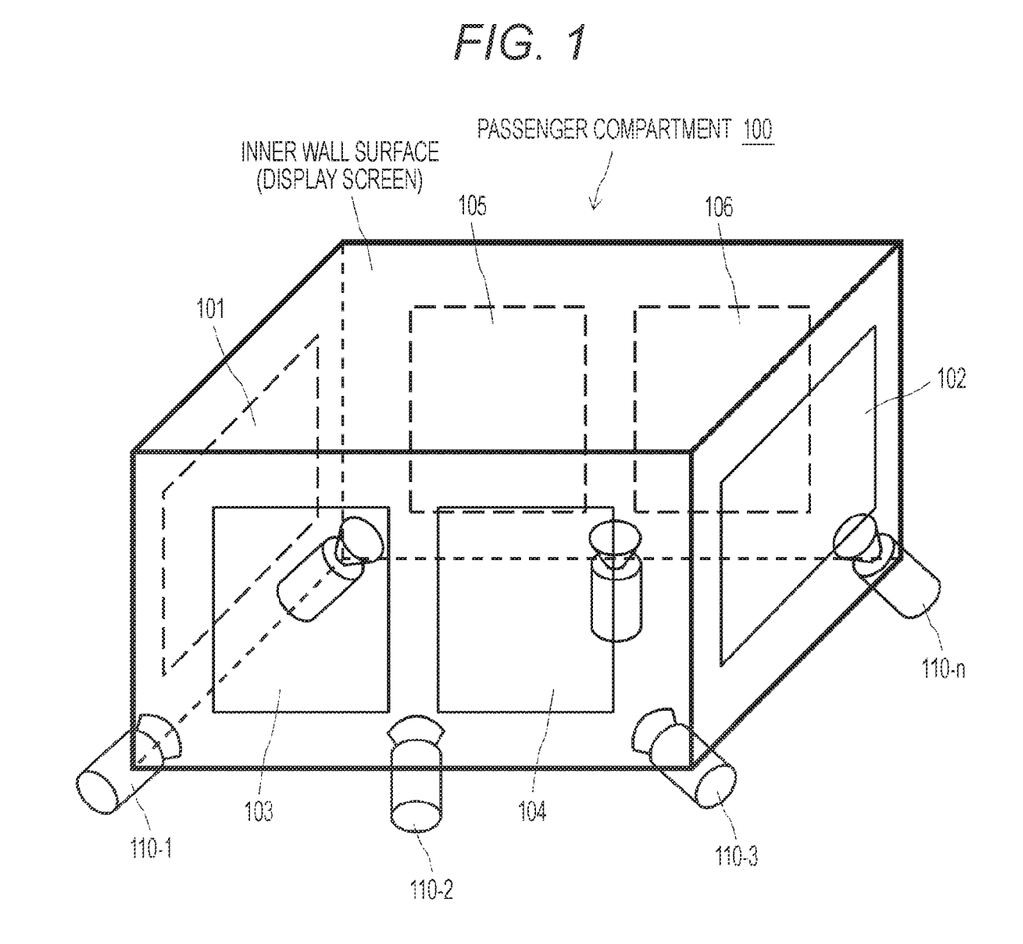
FIG. 1 is a diagram schematically illustrating a mechanism of using an inner wall surface of a passenger compartment as a full celestial display.

FIG. 1 schematically illustrates a mechanism of using the inner wall surface of the passenger compartment as a full celestial display. However, in order to simplify the drawing, the inner wall surface of the passenger compartment 100 is depicted as a rectangular parallelepiped.

A plurality of projectors 110-1, 110-2, . . . , and 110-N are installed in the passenger compartment 100 and images are projected from the respective projectors, such that a full celestial movie can be displayed on the inner wall surface of the passenger compartment 100. However, the full celestial movie referred to in the present description is not required to display a 360-degree movie and a partial field of view may be missing. Furthermore, the full celestial movie may be a semi celestial movie that does not include a floor surface with less information (this similarly applies to the following).

The reasons for using a plurality of the projectors 110-1, 110-2, . . . , and 110-N include that, with only one projector, the movie cannot be displayed on the entire inner wall surface of the passenger compartment 100 and shadows of occupants present in the passenger compartment 100 are formed. In a case where the full celestial movie can be displayed on the inner wall surface of the passenger compartment 100 without producing any shadows while all of the equipped projectors 110-1, 110-2, . . . , and 110-N are not used, unnecessary projectors may be turned off. In the case of displaying a single movie with a plurality of projectors, it is assumed that a stitching process is conducted on joint portions between projected images from adjacent projectors such that the joint portions are matched.

Note that, in order to display the full celestial movie on the inner wall surface of the passenger compartment 100, it is not limited to the method using a projection type display as illustrated in FIG. 1. For example, a flat display such as a liquid crystal display (LCD) or a flexible display such as an organic electroluminescence (EL) display (OLED) may be affixed on the inner wall surface of the passenger compartment 100, such that the full spherical movie is displayed thereon. Furthermore, also in the case of using any type of display of the projection type, the flat type, or the flexible type, the embodiments are not limited to the configuration as illustrated in FIG. 1, in which all the inner wall surface of the passenger compartment 100 is utilized as a screen, but include the cases of, for example, utilizing only the three surfaces except the windshield, only the windshield, and only the ceiling as screens.

In the example illustrated in FIG. 1, a passenger compartment of a 4-door ordinary passenger car is assumed and the inner wall surface of the passenger compartment 100 includes a windshield 101, a rear window 102, and side windows 103 to 106 for each seat (a driver's seat, a front passenger's seat, and left and right rear seats). Although the illustration is omitted, the vehicle is equipped with a sunroof in some cases.

These window glasses (at least some of the window glasses) can be, for example, electrically switched between a transmissive state in which light is transmitted and a non-transmissive state in which no light is transmitted (or light is blocked) and, in a transmission-disabled state, it is assumed that the projected image from the projector can be displayed thereon. Alternatively, each of the side windows 103 to 106 (or some of the side windows) may be constantly in the transmission-disabled state so as to be placed in the transmissive state by opening the window. Alternatively, each of the side windows 103 to 106 (or some of the side windows) may be constantly in the transmission-disabled state so as to be placed in an apparent transmissive state by displaying a live surrounding movie captured by the in-vehicle camera within the frame of the window (for example, by implementing a "video see-through" style). Note that the sunroof may also have the transmissive state and the non-transmissive state similarly using any of the above methods.

When all the windows 101 to 106 provided in the passenger compartment 100 are placed in the non-transmissive state and the full celestial movie is displayed on the entire inner wall surface of the passenger compartment 100 without interruption, a passenger present in the passenger compartment 100 can be deeply immersed into such a movie. In other words, by displaying the full celestial movie in a closed space such as the passenger compartment 100, it is possible to construct a virtual space with a feeling of immersion. For example, if the vehicle is being automatically driven, a movie of content such as the full celestial movie may be displayed using the entire inner wall surface of the passenger compartment 100 including the windshield.

A variety of movies is displayed on the inner wall surface of the passenger compartment 100. For example, commercial content such as films may be used, while movies captured by an in-vehicle camera installed in a vehicle, movies captured by a moving camera installed in a vehicle other than the own vehicle or a flying body (such as a drone), or movies captured by a fixed-point camera fixed to an arbitrary location may be used. Furthermore, the captured movie may be a live movie or an archival movie. Alternatively, the movie displayed on the inner wall surface of the passenger compartment 100 is not limited to a live-view movie but may be a movie reproduced by a computer graphics (CG) technology.

For example, by displaying, on the inner wall surface of the passenger compartment 100, a movie imaging a living room at home or a favorite place (a regularly used cafe terrace, a regularly visited park, a frequently used library, and the like) of a passenger, there are cases where a comfortable virtual space where the passenger can relax very much can be constructed. By constructing a virtual space in the passenger compartment 100, even under the condition that, for example, the vehicle is being caught in a traffic congestion, the passenger does not have to feel uncomfortable. For example, if the vehicle is being automatically driven, the full celestial movie may be displayed using the entire inner wall surface of the passenger compartment 100 including the windshield, such that all passengers including the driver can be immersed into the virtual space.

What type of full celestial movie to display in the passenger compartment 100 may be specified by the passenger via manual input, voice instruction, or the like, or automatically selected by the vehicle (system). For example, the full celestial movie to display may be automatically selected from among many items of movie content on the basis of a movie display history of the vehicle and a viewing history or action history of the passenger. Alternatively, the movie content may be specified for the vehicle from the outside via vehicle to X (V2X) communication (vehicle-to-vehicle communication and vehicle-to-infrastructure communication) or the like.

Furthermore, there is a variety of methods for acquiring the movie content to be displayed on the inner wall surface of the passenger compartment 100 of the vehicle. For example, the movie content may be stored in advance in a recording device mounted in the vehicle or a portable medium (such as a Blu-ray disc) in which the movie content is recorded may be brought into the passenger compartment 100 to be played back. Alternatively, a movie streaming-distributed from an external apparatus such as a movie server may be received via, for example, the V2X communication.

Although a virtual space can be constructed in the passenger compartment 100, it is assumed that the passenger wishes to confirm or should confirm a landscape around the vehicle, in different terms, the real space, by suspending the viewing of the movie temporarily.

For example, the passenger wishes to confirm the real space or needs to confirm the real space when approaching a destination of a trip or a drive, when passing near a point of interest (a place the passenger wishes to see or a place where the passenger wishes to drop in) although not the destination, when a person of interest (a person to meet for appointment or a close acquaintance (family, a friend, a superior, or a colleague), and the like) or an object of interest (a building, a rare automobile, a pet, and the like) are coming into sight, when the weather changes, when encountering an accident or a disaster, or the like. There are of course times when the passenger personally wishes to break the viewing of the full celestial movie or becomes interested in the outside world.

According to the configuration of the full celestial display using the inner wall surface of the passenger compartment 100 as illustrated in FIG. 1, at least some of the windows 101 to 106 provided in the passenger compartment 100 is provided with the transmissive state together with the non-transmissive state. Therefore, by switching at least some of the windows 101 to 106 from the non-transmissive state to the transmissive state, it is possible to observe a landscape outside the vehicle through the window in the transmissive state (or displayed on the window in a transmissive state manner), even while the full spherical movie is being displayed.

The "transmissive state" of the window referred to herein means any of, for example, a state in which the window glass is electrically placed in the transmissive state in which light is transmitted from the non-transmissive state in which light is blocked, or a state in which light is not transmitted but the outside of the vehicle is made to be visible by opening the window, or a state in which the live surrounding movie captured by the in-vehicle camera is displayed within the frame of the window that still does not transmit light (as described above).

However, because the passenger is immersed too deeply into the full celestial movie displayed in the closed space such as the passenger compartment 100, there is a possibility that the passenger misses the timing at which the passenger wishes to confirm or should confirm the real space.

During manual driving or in the case of a car-for-hire, since the driver always gazes at the outside world, the driver can tell other passengers of the appropriate timing. The passenger can confirm a landscape outside the vehicle by switching at least some of the windows to the transmissive state (for example, by opening the window) when prompted by the driver.

In contrast to this, in a vehicle being automatically driven, there is no driver and all the passengers are sometimes immersed deeply into the virtual space. Accordingly, the possibility of missing the timing at which the passengers wish to confirm or should confirm the real space cannot be eliminated.

Thus, in the present embodiment, during a period in which all the windows 101 to 106 are placed in the non-transmissive state and the full spherical movie is displayed over the entire inner wall surface of the passenger compartment 100 (that is, a virtual space is constructed in the passenger compartment 100), the condition of the vehicle is constantly monitored and, in response to automatic detection of the rise of an event for which the passenger wishes to confirm or should confirm a landscape around the vehicle (that is, the condition of the real space), at least some of the windows are placed in the transmissive state, for example, by opening the windows, such that the passenger can confirm the landscape from the vehicle.

In short, the vehicle is configured to constantly monitor the condition of the vehicle during a period in which the virtual space is constructed in the passenger compartment and automatically switch the window to the transmissive state when detecting that a predetermined event has occurred. However, since there are cases where the passenger does not like to interrupt the immersed virtual space, the approval for switching may be obtained from the passenger via a graphical user interface (GUI) or the like when the window is switched to the transmissive state.

Furthermore, when detecting that the predetermined event has disappeared during a period in which the window is switched to the transmissive state, the vehicle may automatically return the window in the transmissive state to the non-transmissive state and reconstruct the virtual space in which the full celestial movie is displayed using the entire inner wall surface of the passenger compartment 100. This is because, for example, when having passed through a point of interest, a person of interest, or an object of interest, the passenger no longer needs to see outside the vehicle. As a matter of course, when the window is switched from the transmissive state to the non-transmissive state, approval may be obtained from the passenger via the GUI or the like. The reason is that there are cases where the passenger wishes to continue confirming or observing the real space, that is, the circumstances outside the vehicle.

Detection targets to be monitored in order to automatically switch the window between the transmissive state and the non-transmissive state are various, including the current position of the vehicle, the condition outside the vehicle, the condition inside the vehicle, and the surrounding environment. The content of each detection target and detection methods and detection devices are summarized below.

(1) Current Position of Vehicle

When the current position of the vehicle is approaching a destination of a trip or a drive or is passing near a point of interest (a place the passenger wishes to see or a place where the passenger wishes to drop in) although not the destination, the passenger wishes to confirm the real space or needs to confirm the real space.

For example, the current position of the vehicle can be detected using a positioning unit that receives a global navigation satellite system (GNSS) signal from a GNSS satellite (for example, a GPS signal from a GPS satellite) to execute positioning and generates position information including the latitude, longitude, and altitude of the vehicle. Alternatively, the positioning unit may locate the current position on the basis of electrical measurement information from a wireless access point using PlaceEngine (registered trademark) or the like, or may acquire position information from a mobile terminal carried by the passenger, such as a mobile phone, a personal handy-phone system (PHS), or a smartphone having a positioning function, by way of a Wi-Fi communication or a universal serial bus (USB) cable.

As for the destination, the passenger may specify the destination directly via, for example, an input unit equipped in an instrument panel. The passenger may instruct the destination by voice. Alternatively, the destination may be automatically determined by analyzing a past action history of the passenger, the content of the conversation inside the vehicle between the passengers, and the like. The past action history may be recorded in the form of a dashboard camera or the like, or may be recorded in an information terminal carried by the passenger, such as a smartphone, or may be acquired by inquiring a personal information server via V2X communication or the like.

Furthermore, as for the point of interest, map information may be used to extract the point of interest located on the route of the vehicle. The map information may be stored in advance in a recording device mounted in the vehicle or may be sequentially acquired from the outside via V2X communication or the like. Alternatively, the point of interest may be detected on the basis of a result of object recognition performed on a movie captured by the in-vehicle camera. In addition, an object such as a building recognized on a movie captured by the in-vehicle camera may be collated with an external database via V2X communication or the like to determine whether or not the collated object is a point of interest.

The point of interest is not always universal. What is regarded as the point of interest (that is, the definition of the point of interest) may be designated on the basis of, for example, the taste and preference and the past action history of the passenger. The taste and preference and the past action history of the passenger may be recorded in an information terminal carried by the passenger, such as a smartphone, or may be acquired by inquiring a personal information server via V2X communication or the like.

Furthermore, the definition of the point of interest sometimes varies depending on the season, time period, weather, and other factors. Examples of this case include a place the passenger wishes to see during the day but does not need to see at night or under bad weather, and a famous place for cherry blossoms when out of flowering season. In such a case, a clock or an environmental sensor for detecting the current weather or meteorology should also be added to a detection device for detecting the point of interest.

Then, when the current position of the vehicle acquired by the positioning unit is collated with the position information associated with the destination or the point of interest and the current position enters within a predetermined range from the destination or the point of interest, the window is switched to the transmissive state such that the passenger can see a landscape outside the vehicle. However, it is not necessary to place all the windows in the transmissive state and only a window from which the destination or the point of interest is clearly visible may be placed in the transmissive state such that a feeling of immersion into the virtual space is maintained as much as possible.

Note that, when the vehicle has arrived at the destination (or when a predetermined time has elapsed since arrival) or when the vehicle has passed through the point of interest, the window switched to the transmissive state may be returned to the non-transmissive state such that the virtual space in the passenger compartment 100 is reconstructed.

(2) Condition Outside Vehicle

The conditions outside the vehicle that could trigger switching of the window to the transmissive state include a case, for example, where a person of interest (a person to meet for appointment or a close acquaintance (family, a friend, a superior, or a colleague), and the like) or an object of interest (a building, a rare automobile, a pet, and the like) has appeared.

For example, it is possible to detect the person of interest or the object of interest by performing face recognition or object recognition on a movie captured by the in-vehicle camera. Furthermore, in order to enable the detection even by a simple image recognition process, visual recognition information such as a two-dimensional barcode or a marker may be put on a surface of the person of interest or the object of interest such that the person of interest or the object of interest is detected on the basis of these pieces of visual recognition information. Alternatively, the person of interest or the object of interest may be equipped with an oscillator that emits a specific wireless signal such that the person of interest or the object of interest is detected by the vehicle receiving the wireless signal with a receiver.

The person of interest and the object of interest are defined arbitrarily. The passenger may specify an own person of interest or object of interest in advance for the vehicle. Alternatively, the person of interest or the object of interest may be designated on the basis of the taste and preference and the past action history of the passenger. The taste and preference and the past action history of the passenger may be recorded in an information terminal carried by the passenger, such as a smartphone, or may be acquired by inquiring a personal information server via V2X communication or the like. Furthermore, instead of determining the person of interest or the object of interest in the vehicle, a movie captured by the in-vehicle camera (or information associated with a face or an object recognized in the captured movie) may be collated with a personal information server such that a determination result as to whether or not the target is a person of interest or a person of interest or an object of interest is returned to the vehicle.

Then, when the person of interest or the object of interest is detected by any one of the above detection methods or detection devices, the window is switched to the transmissive state such that the passenger can see a landscape outside the vehicle. However, it is not necessary to place all the windows in the transmissive state and only a window from which the person of interest or the object of interest is clearly visible may be placed in the transmissive state such that a feeling of immersion into the virtual space is maintained as much as possible. Alternatively, in a case where a person of interest (for example, a person to meet for appointment) of only some of the passengers is detected, only a side window closest to the some of passengers may be switched to the transmissive state.

Furthermore, when the vehicle has moved away from the person of interest or the object of interest, the window switched to the transmissive state may be returned to the non-transmissive state such that the virtual space in the passenger compartment 100 is reconstructed.

(3) Condition Inside Vehicle

The conditions inside the vehicle that could trigger switching of the window to the transmissive state include cases, for example, where the passenger feels unwell (motion sickness and the like), the passenger wishes to see the outside, and some passengers have smoked and ventilation of the passenger compartment is required.

For example, by using an in-vehicle camera (Dramoni camera) that images the inside of the vehicle, a thermographic camera, or a bio-sensor that detects bio-information (perspiration, body temperature, heartbeat, and the like) of the driver or each passenger, how the passengers are spending or the state of health and smoking state of the passengers can be monitored. Furthermore, an image captured by the Dramoni camera may be analyzed to understand a gesture of the passenger indicating that the passenger wishes to see the outside, or the voice from the passenger may be input by way of a microphone that collects the sound inside the vehicle. In addition, using a smoke sensor, it is also possible to detect that the passenger has started to smoke.

Then, when it is detected that the above-exemplified events have occurred in the vehicle, the window is switched to the transmissive state such that the passenger can see a landscape outside the vehicle or the inside of the vehicle can be called. However, it is not necessary to place all the windows in the transmissive state and only a window closest to a specific passenger (for example, a person who feels unwell, a person who wishes to see the outside of the vehicle, or a person who is smoking) may be placed in the transmissive state such that a feeling of immersion into the virtual space is maintained as much as possible.

Thereafter, when the triggering event that has switched the window to the transmissive state is no longer detected in the vehicle (when the passenger has recovered from feeling unwell, when the passenger has seen a landscape outside the vehicle enough, when the passenger has finished smoking, and the like), the window switched to the transmissive state may be returned to the non-transmissive state such that the virtual space in the passenger compartment 100 is reconstructed.

Furthermore, conversely, a condition inside the vehicle that could trigger switching of the window in the transmissive state to the non-transmissive state is also assumed. An example of this case is when the passengers do not want to be peeped from outside the vehicle, such as when the passengers begin meals or parties and secret conversations in the vehicle or secretly meet with someone in the vehicle. These events can be detected, for example, by analyzing an image captured by the Dramoni camera or the sound in the vehicle collected by the microphone. Then, in a case where there is a window in the transmissive state at the time point when these events are detected, this window is switched to the non-transmissive state. Alternatively, if it is possible to hide a thing not wanted to be peeped from outside the vehicle, some of the windows may be remained in the transmissive state.

(4) Surrounding Environment

The surrounding environments that could trigger switching of the window to the transmissive state include cases, for example, where the weather changes or the vehicle encounters an abnormal situation such as an accident or a disaster. When such an event has occurred, the passenger sometimes wishes to confirm (or needs to confirm) the condition in the periphery of the own vehicle through the window by suspending the viewing of the full celestial movie temporarily.

Alternatively, depending on the surrounding environment, it is conversely desirable in some cases to close the window to place in the non-transmissive state. For example, during rain, snow, storm, lightning, or extremely hot or cold weather, the window cannot be kept open. Furthermore, when the own vehicle is caught in a traffic congestion, the passenger gets bored and no longer wishes to see a dull landscape outside the vehicle; consequently, the passenger wishes to be immersed into the virtual space. In addition, when the passenger encounters an accident or a disaster, the window cannot be kept open if the passenger cannot bear the loud siren of an emergency vehicle or the excitement of the curious crowd, or if smoke or odor spreads in the periphery of the vehicle. In the case of the transmissive state with the window opened, the window should be switched to the non-transmissive state by being completely closed.

With regard to the weather, an event that demands to place the window in the non-transmissive state can be detected on the basis of the environmental sensor for detecting the current weather or meteorology, an image of the periphery of the vehicle captured by the in-vehicle camera, weather information received via V2X communication, and the like. With regard to traffic congestion information, information emitted from an information agency such as a road traffic center can be received via radio broadcasting, V2X communication, or the like. Furthermore, accidents and disasters can be detected on the basis of emergency information distributed by radio broadcasting or one-segment broadcasting.

Then, when it is detected that the above-exemplified events have occurred around the vehicle, the window is switched to the transmissive state or conversely the window in the transmissive state is switched to the non-transmissive state, depending on each detected condition.

As already mentioned, the "transmissive state" of the window can be realized by a variety of methods, for example, by electrically placing the window glass in the transmissive state in which light is transmitted from the non-transmissive state in which light is blocked, by implementing a state in which light is not transmitted but the outside of the vehicle is made to be visible by opening the window, or by displaying the live surrounding movie captured by the in-vehicle camera within the frame of the window that still does not transmit light. When at least one window equipped on the vehicle is placed in the transmissive state, the passenger can observe a landscape outside the vehicle.

In a case where the entire inner wall surface of the passenger compartment 100 is deemed as a display unit having a display screen (for displaying the full celestial movie) as illustrated in FIG. 1, when one window is placed in the transmissive state even while the full celestial movie is being displayed, the passenger can observe a landscape outside the vehicle through the one window. Hereinafter, a display mode of the display unit when at least one window is placed in the transmissive state and a landscape outside the vehicle can be seen will be called "transmissive mode". On the other hand, when all the windows are placed in the non-transmissive state and a movie is displayed on the entire inner wall surface of the passenger compartment 100, the passenger cannot observe a landscape outside the vehicle at all. Hereinafter, a display mode of the display unit in a state in which a movie of content is displayed on at least some of the windows from which a landscape outside the vehicle is visible, or a movie of content is displayed on the entire inner wall surface of the passenger compartment 100 including all the windows, or in a state in which all the windows are placed in the non-transmissive state, is called "non-transmissive mode".

Figure 2:
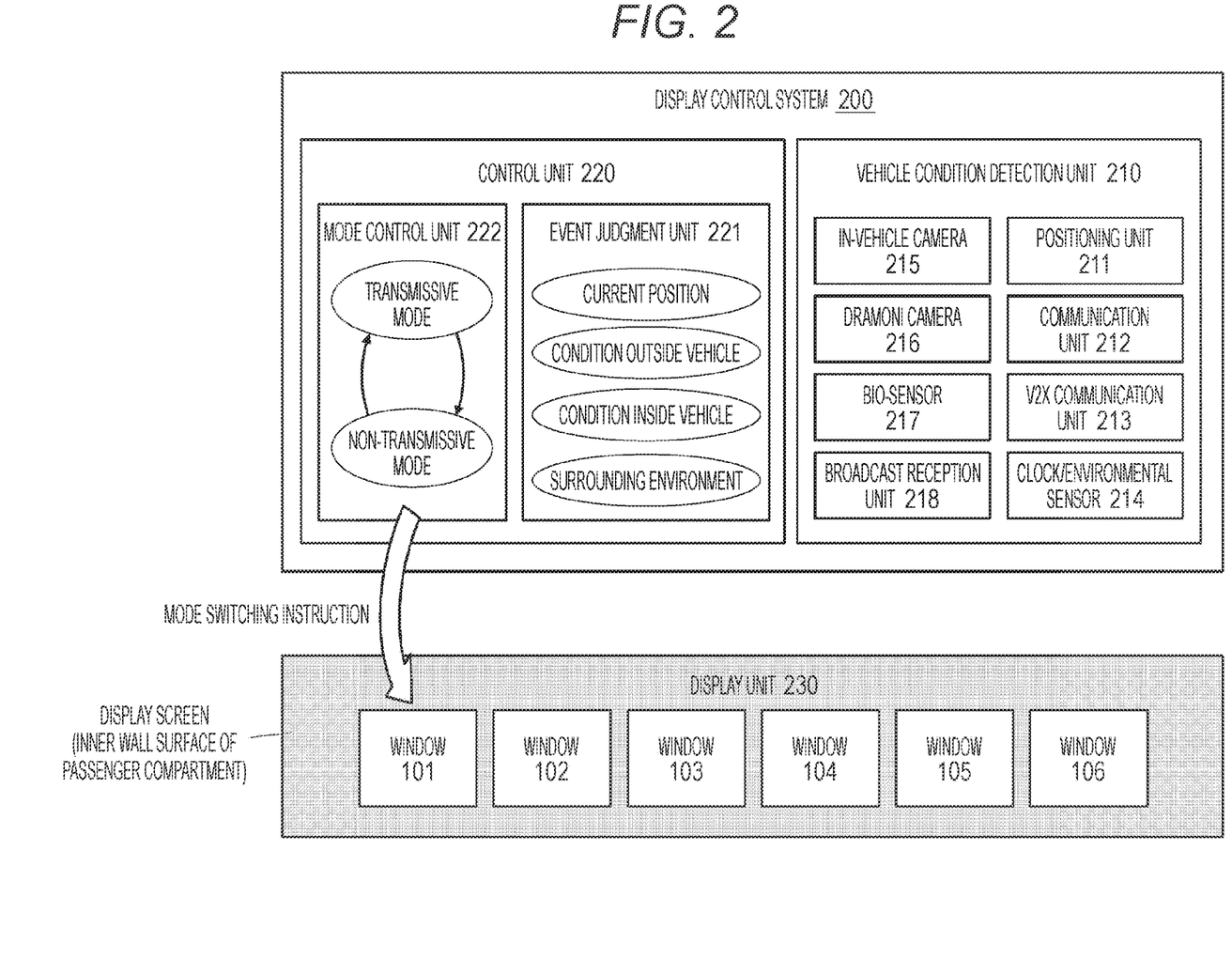
FIG. 2 is a diagram schematically illustrating a functional configuration of a display control system 200.

FIG. 2 schematically illustrates the functional configuration of a display control system 200 for controlling the switching of the display mode of the display unit utilizing the entire inner wall surface of the passenger compartment 100 as a display screen, as illustrated in FIG. 1. The illustrated display control system 200 is provided with a vehicle condition detection unit 210 and a control unit 220 and controls the display mode of a display unit 230.

The vehicle condition detection unit 210 is equipped with a plurality of detection devices for detecting the condition of the vehicle, such as a positioning unit 211, a communication unit 212, a V2X communication unit 213, a clock/environmental sensor 214, an in-vehicle camera 215, a Dramoni camera 216, a bio-sensor 217, and a broadcast reception unit 218. The positioning unit 211 performs positioning of the current position of the vehicle. The communication unit 212 communicates with an information terminal within the vehicle (carried by the passenger) by way of Wi-Fi, a USB cable, or the like. The V2X communication unit 213 communicates with an external apparatus via V2X communication. The clock/environmental sensor 214 is a clock that measures the current time and detects weather or meteorology. The in-vehicle camera 215 images the periphery of the vehicle. The Dramoni camera 216 images the inside of the vehicle. The bio-sensor 217 detects bio-information (perspiration, body temperature, heartbeat, and the like) of the passenger. The broadcast reception unit 218 receives radio broadcasting and one-segment broadcasting. However, the detection devices listed here are examples and not all of them are indispensable. Some detection devices are not included (or are not used for higher-level detection in the vehicle) in some cases. Furthermore, the vehicle condition detection unit 210 may include a detection device other than those exemplified here.

The control unit 220 includes an event judgment unit 221 that judges whether or not an event that demands to switch the display mode of the display unit 230 has occurred, on the basis of the detection results of the respective detection devices of the vehicle condition detection unit 210, and a mode control unit 222.

On the basis of the detection results of the respective detection devices of the vehicle condition detection unit 210, the event judgment unit 221 judges whether or not an event that demands to switch the display mode of the display unit 230 from the non-transmissive mode to the transmissive mode, or conversely, from the transmissive mode to the non-transmissive mode, has occurred in any of the current position, the condition outside the vehicle, the condition inside the vehicle, or the surrounding environment. What types of the current position, the condition outside the vehicle, the condition inside the vehicle, and the surrounding environment specifically fall under the events is as already described and accordingly the explanation is omitted here.

In a case where the display mode corresponding to the event judged by the event judgment unit 221 is different from the current display mode of the display unit 230, the mode control unit 222 controls a mode switching process for the display unit 230.

An example of the display unit 230 is as illustrated in FIG. 1. In other words, the display unit 230 uses the entire inner wall surface of the passenger compartment 100 of the vehicle as a display screen. The display screen is, for example, a projection screen and is capable of displaying the full celestial movie using a plurality of projectors. Furthermore, the inner wall surface includes the plurality of windows 101 to 106 such as the windshield, the rear window, the side windows, the sunroof, and the like.

At least some of the windows can be switched between the transmissive state and the non-transmissive state by any method such as electric switching between transmission and non-transmission of light, opening/closing operation of the window glass, or display of the video see-through movie within the window frame. As defined above, if at least one window is in the transmissive state and a landscape outside the vehicle can be seen, the display unit 230 is in the transmissive mode. Furthermore, in the case of a state in which a movie of content is displayed on at least some of the windows from which a landscape outside the vehicle is visible, or a movie of content is displayed on the entire inner wall surface of the passenger compartment 100 including all the windows, or a state in which all the windows are in the non-transmissive state, the display unit 230 is in the non-transmissive mode. For example, in conjunction with when the display unit 230 is caused to transition from the transmissive mode to the non-transmissive mode, the open window may be closed to reserve an area for displaying a movie of content.

The mode control unit 222 controls the display unit 230 to a display mode corresponding to the event judged by the event judgment unit 221. For example, if the display unit 230 is in the transmissive mode when the current position of the vehicle has arrived at or is moving closer to the destination or the point of interest, the mode control unit 222 switches the display unit 230 to the non-transmissive mode. Furthermore, if the display unit 230 is in the non-transmissive mode when the vehicle approaches the person of interest or the object of interest, or the person of interest or the object of interest has appeared, the mode control unit 222 switches the display unit 230 to the transmissive mode. Conversely, when the vehicle has moved away from the person of interest or the object of interest, the display unit 230 may be switched from the transmissive mode to the non-transmissive mode. In addition, when the display mode of the display unit 230 is not adapted to the condition inside the vehicle (the intention, the state of health, the mental state, and the like of the passenger), the mode control unit 222 switches the display unit 230 from the transmissive mode to the non-transmissive mode or from the non-transmissive mode to the transmissive mode. Furthermore, when the display mode of the display unit 230 is not adapted to the surrounding environment of the vehicle, the mode control unit 222 switches the display mode of the display unit 230. For example, when the vehicle encounters an abnormal situation such as an accident or a disaster, the display unit 230 is set to the transmissive mode such that the passenger can confirm the condition in the periphery of the vehicle. In addition, when the vehicle is caught in a traffic congestion, the display unit 230 is set to the non-transmissive mode such that the passenger does not have to see an uncomfortable landscape.

When switching the display unit 230 to the non-transmissive mode, the mode control unit 222 instructs the display unit 230 to switch all the windows currently in the transmissive state to the non-transmissive state.

Furthermore, when switching the display unit to the transmissive mode, the mode control unit 222 designates whether all the windows are to be placed in the transmissive state or only some of the windows are to be placed in the transmissive state (that is, the locations of the windows to be placed in the transmissive state) and instructs the display unit 230 to switch the windows to the transmissive state.

The methods of placing the display unit in the transmissive mode are various as described above. One of the methods is a method of displaying a live movie captured by the in-vehicle camera within the frame of the window in a video see-through style. However, there is a difficulty that, when the window is opened during the video see-through display, a movie displayed as a video see-through display and a landscape outside the vehicle seen through the opened window do not match.

Figure 3:
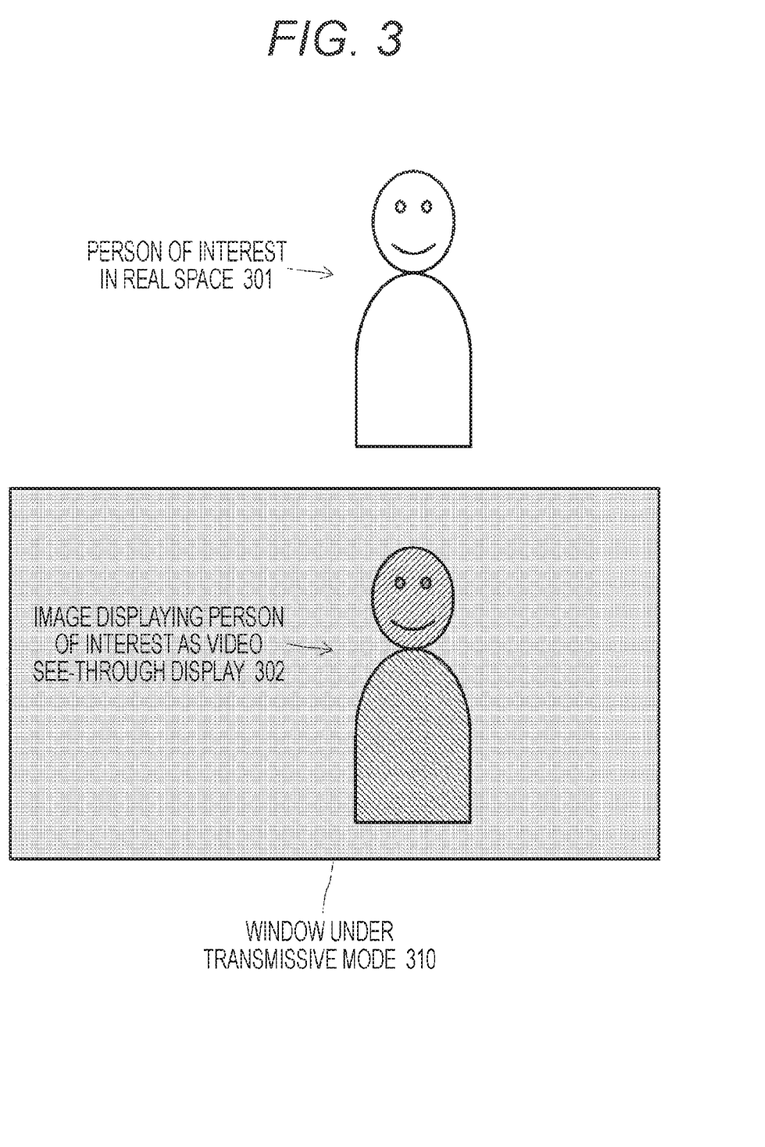
FIG. 3 is a diagram illustrating how a movie captured by an in-vehicle camera is displayed as a video see-through display within a frame of a window under a transmissive mode.
Figure 4:
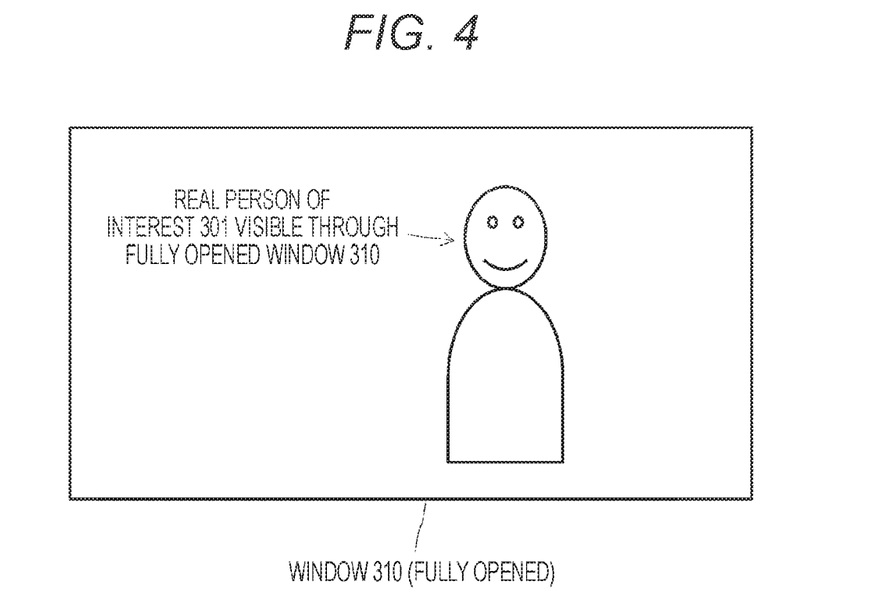
FIG. 4 is a diagram illustrating a landscape outside the vehicle that is visible through a window when the window is fully opened, as contrasted with FIG. 3.

FIG. 3 illustrates how a person of interest 301 detected in the real space is imaged by an in-vehicle camera (not illustrated) and an image capturing the person of interest is displayed as a video see-through display within the frame of a window 310 under the transmissive mode as indicated by reference numeral 302. It is assumed that the video see-through image 302 illustrated in FIG. 3 is completely consistent with a landscape outside the vehicle which is visible when the window 310 is fully opened (refer to FIG. 4). However, in FIG. 3, although the movie 302 of the person of interest displayed as a video see-through display is completely consistent with the person of interest 301 in the real space, the movie 302 is filled with diagonal lines and the background is depicted in gray in order to discriminate that the movie 302 is a video see-through display (this similarly applies to the following).

Figure 5:
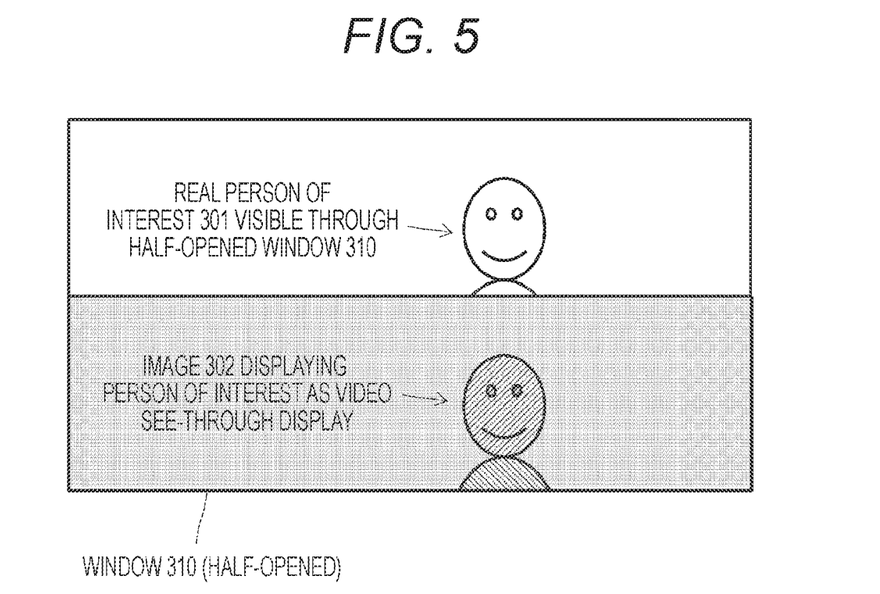
FIG. 5 is a diagram illustrating how a movie captured by an in-vehicle camera is displayed as a video see-through display on a window in a half-opened state.

FIG. 5 illustrates how the movie 302 of the person of interest is displayed as a video see-through display on the window 310 opened halfway. If the same video see-through movie continues to be displayed on the window 310 irrespective of an opening/closing position of the window 310, as can be seen from FIG. 5, the video see-through movie does not match a landscape outside the vehicle and an unsightly movie is shown to the passenger. Furthermore, maintaining the window 310 in a state of being half-opened will cause the passenger to continue seeing such an unsightly movie for a long time, resulting in having an illusion or feeling dizzy which may lead to health hazards.

By restricting or prohibiting the opening and closing operation of the window placed in the transmissive state because of the video see-through display by the in-vehicle camera, it is certainly possible to prevent the occurrence of difficulty of mismatch between the video see-through movie and the actual landscape outside the vehicle, as illustrated in FIG. 5. However, if the person of interest is a person to meet for appointment, the passenger needs to open a window and speak to this person of interest. Furthermore, in a case where the person of interest is a close acquaintance, or a superior or a colleague of the company, the passenger sometimes should greet or wishes to greet this person of interest. Consequently, there are cases where it is not appropriate to restrict or prohibit the opening and closing operation of the window placed in the transmissive state.

Figure 6:
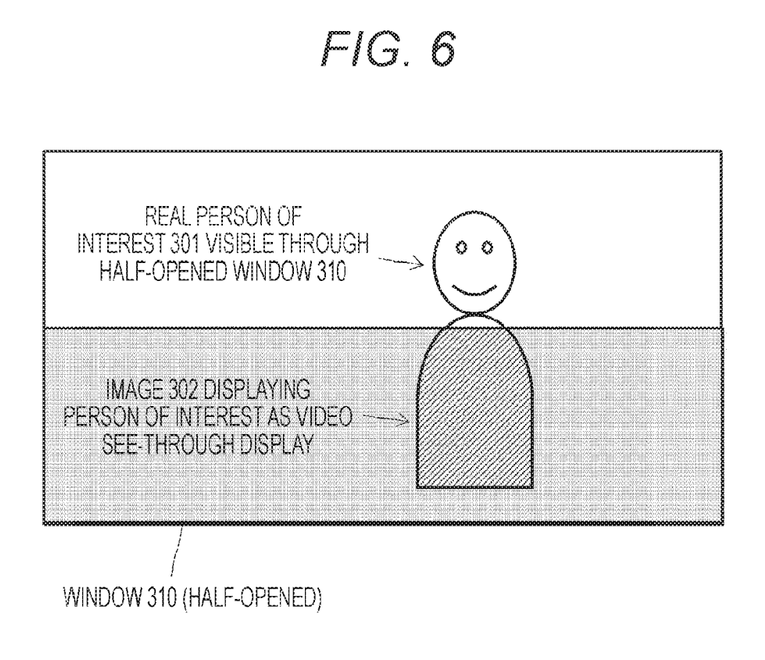
FIG. 6 is a diagram illustrating how a movie captured by an in-vehicle camera is displayed as a video see-through display on a window in a half-opened state.

Thus, as illustrated in FIG. 6, the display of the video see-through movie 302 may be adjusted in conjunction with an opening/closing position of the window 310 such that the video see-through movie and the actual landscape outside the vehicle are matched. For example, if an upper end position of an area read as a movie for display from a video frame (not illustrated) in which a movie taken by the in-vehicle camera is temporarily written is shifted downward in accordance with an opening/closing position of the window 310, the video see-through movie can be made to be an actual landscape outside the vehicle.

Figure 7:
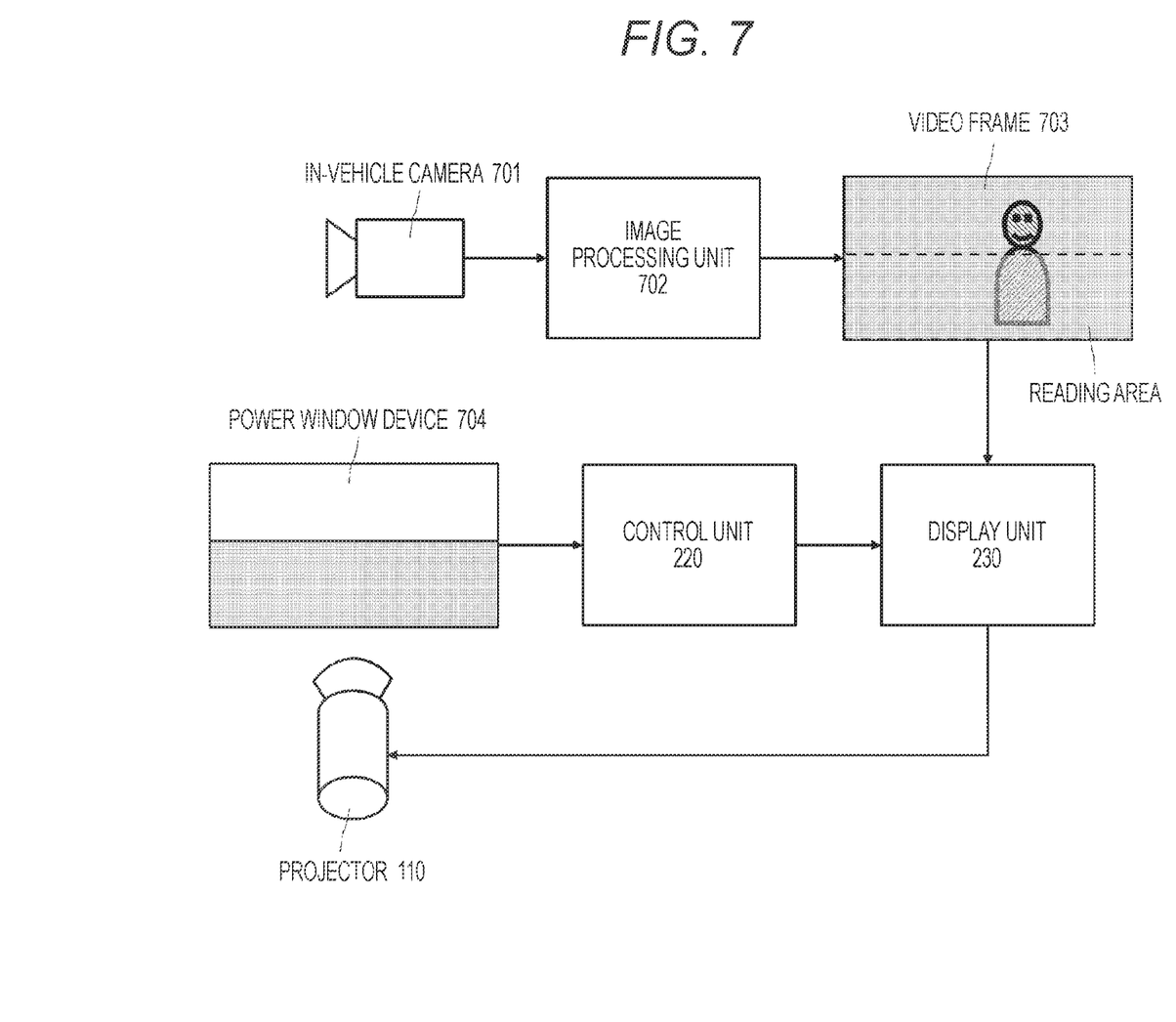
FIG. 7 is a diagram illustrating a functional configuration for controlling display of a video see-through movie in conjunction with an opening/closing position of a power window.

In a case where the window 310 is a power window device, a reading position of the video frame can be controlled according to a driving amount of the power window device (for example, an upper end position of an area read as a movie for display is shifted downward in accordance with an opening/closing position of the window 310). FIG. 7 illustrates a functional configuration for controlling display of a video see-through movie in conjunction with an opening/closing position of a power window. An imaging signal of an in-vehicle camera 701 is subjected to processes such as development by an image processing unit 702 and written in a video frame 703. Meanwhile, upon acquiring information associated with a current driving amount of a window in the transmissive state, that is, during the video see-through display, from a power window device 704, the control unit 220 under the transmissive mode converts the information into the angle of view to be used for display on that window and notifies the display unit 230 thereof. Then, in accordance with the notification from the control unit 220, the display unit 230 reads a movie signal of an appropriate area of the video frame 703 (an area obtained by shifting downward the upper end position of the area to be read in accordance with an opening/closing position of the window 310) and displays the read movie signal on that window (for example, projects a movie from the projector 110 to the window in a half-opened state).

According to the present embodiments, as described so far, for example, by displaying the full spherical movie using the inner wall surface of the passenger compartment 100 of the vehicle being automatically driven, it is possible to construct a virtual space with a feeling of immersion for the passenger; at the same time, conditions that compel the passenger to confirm the circumstances outside the vehicle can be automatically detected such that a landscape outside the vehicle is shown to the passenger using at least some of the windows.

INDUSTRIAL APPLICABILITY

The technology disclosed in the present description has been described thus far in detail with reference to specific embodiments. However, it is self-evident that modification and substitution of the embodiments can be made by a person skilled in the art without departing from the spirit of the technology disclosed in the present description.

The technology disclosed in the present description can be applied to a variety of vehicles such as automobiles (including gasoline and diesel vehicles), electric vehicles, hybrid electric vehicles, motorcycles, bicycles, and personal mobility. Additionally, the technology disclosed in the present description can also be applied to a moving body in a form other than a vehicle that travels on a road (robot, airplane, ship, and the like).

In conclusion, the technology disclosed in the present description has been described in a form of examples and the content described in the present description should not be narrowly construed. In order to examine the spirit of the technology disclosed in the present description, claims should be considered.

Note that the technology disclosed in the present description can be configured as follows.

(1) A display control device including:
a detection unit that detects a condition of a moving body; and
a control unit that controls a display mode of a display unit having a transmissive mode in which a landscape outside the moving body is displayed on at least a part of a display screen, on the basis of a detection result of the detection unit.

(2) The display control device according to (1) above, in which
the display unit has the transmissive mode and a non-transmissive mode in which a content movie is displayed by superimposing the content movie onto at least a part of the landscape outside the moving body or on the entire display screen, and
the control unit sets the display unit to either the transmissive mode or the non-transmissive mode according to a detection result of the detection unit.

(3) The display control device according to (1) above, in which
the display unit displays a movie on the display screen constituted by an inner wall surface of the moving body.

(4) The display control device according to (1) above, in which
the moving body is provided with a window, and
the display unit displays a movie on the display screen constituted by an inner wall surface of the moving body including the window.

(5) The display control device according to (4) above, in which
the window is allowed to be opened and closed, and
the display unit displays, in the transmissive mode, a landscape outside the moving body on at least a part of the display screen by opening the window or including the window and, in the non-transmissive mode, displays a content movie by superimposing the content movie onto at least a part of the landscape outside the moving body displayed on the display screen including the window with the window closed or on the entire display screen.

(6) The display control device according to (4) above, in which
the window is allowed to be switched between a transmissive state in which light is transmitted and a non-transmissive state in which light is blocked, and
the display unit places, in the transmissive mode, the window in the transmissive state such that a landscape outside the moving body is visible and, in the non-transmissive mode, places at least a part of the window in the non-transmissive state such that a content movie is displayed by superimposing the content movie onto at least a part of the landscape outside the moving body or on the entire display screen including the window.

(7) The display control device according to (4) above, in which
the display unit includes the window in the display screen, displays, in the transmissive mode, a movie of a landscape outside the moving body imaged by a camera mounted on the moving body within a frame of the window, and in the non-transmissive mode, displays a content movie by superimposing the content movie onto at least a part of an inside area of the frame of the window or on an entire inside area of the frame of the window.

(8) The display control device according to (2) above, in which
the detection unit acquires information associated with a current position of the moving body, and
the control unit switches the display unit from the transmissive mode to the non-transmissive mode or from the non-transmissive mode to the transmissive mode on the basis of the current position of the moving body.

(9) The display control device according to (2) above, in which
the detection unit acquires information associated with conditions inside and outside the moving body or a surrounding environment of the moving body, and
the control unit switches the display unit from the transmissive mode to the non-transmissive mode or from the non-transmissive mode to the transmissive mode on the basis of the condition outside the moving body.

(10) The display control device according to (9) above, in which
the control unit switches the display unit to the non-transmissive mode in response to the detection unit having detected that a traffic congestion has occurred.

(11) The display control device according to (7) above, in which
the window is allowed to be opened and closed, and
the control unit prohibits opening and closing of the window under the transmissive mode in which a movie captured by a camera mounted on the moving body is displayed within the frame of the window.

(12) The display control device according to (7) above, in which
the window is allowed to be opened and closed, and
the display unit adjusts display within the frame of the window in conjunction with an opening/closing position of the window under the transmissive mode in which a movie captured by a camera mounted on the moving body is displayed within the frame of the window.

(13) A display control method including:
a detection step of detecting a condition of a moving body; and
a control step of controlling a display mode of a display unit having a transmissive mode in which a landscape outside the moving body is displayed on at least a part of a display screen.

(14) A display device including:
a detection unit that detects a condition of a moving body;
a display unit mounted on the moving body and having a transmissive mode in which a landscape outside the moving body is displayed on at least a part of a display screen; and a control unit that controls a display mode of the display unit on the basis of a detection result of the detection unit.

(15) A moving body device including:
a moving body;
a display unit having a transmissive mode in which a landscape outside the moving body is displayed on at least a part of a display screen;
a detection unit that detects a condition of the moving body; and
a control unit that controls a display mode of the display unit on the basis of a detection result of the detection unit.

REFERENCE SIGNS LIST

100 Passenger compartment
101 Windshield
102 Rear window
103 to 106 Side window
110 Projector
200 Display control system
210 Vehicle condition detection unit
211 Positioning unit
212 Communication unit
213 V2X communication unit
214 Clock/environmental sensor
215 In-vehicle camera
216 Dramoni camera
217 Bio-sensor
218 Broadcast reception unit
701 In-vehicle camera
702 Image processing unit
703 Video frame
704 Power window device

The invention claimed is:

1. A display control device mounted on a moving body, comprising:
circuitry configured to:
receive an image of a landscape outside the moving body, wherein the image is captured by a camera;
detect an object in the image of the landscape outside the moving body; and
control a display mode of a display screen based on the detected object, wherein
an inner wall surface of the moving body comprises the display screen,
the display mode is one of a transmissive mode or a non-transmissive mode,
in the transmissive mode, the circuitry is further configured to control the display screen to display the image of the landscape outside the moving body, and
in the non-transmissive mode, the circuitry is further configured to control the display screen to display a content movie superimposed on one of at least a part of the display screen or on an entire inside area of the display screen.

2. The display control device mounted on the moving body according to claim 1, wherein the image of the landscape outside the moving body corresponds to a frame of the display screen.

3. The display control device mounted on the moving body according to claim 1, wherein the circuitry is further configured to switch between the transmissive mode and the non-transmissive mode based on the detected object that matches a specific object.

4. The display control device mounted on the moving body according to claim 1, wherein
the display screen comprises a window,
the circuitry is further configured to switch the window between a transmissive state and a non-transmissive state,
light is transmitted in the transmissive state,
the light is blocked in the non-transmissive state,
in the transmissive mode,
the window is in the transmissive state, and
the landscape outside the moving body is visible, and
in the non-transmissive mode, at least a part of the window is in the non-transmissive state.

5. The display control device mounted on the moving body according to claim 1, wherein
the display screen comprises a window, and
in the transmissive mode, the circuitry is further configured to:
control the display screen to display, within a frame of the window, the image of the landscape outside the moving body; and
prohibit an opening operation and a closing operation of the window.

6. The display control device mounted on the moving body according to claim 5, wherein
the circuitry is further configured to control the display screen to adjust the displayed image within the frame of the window, and
the displayed image is adjusted in conjunction with a position of the window in the transmissive mode.

7. The display control device mounted on the moving body according to claim 1, wherein the circuitry is further configured to:
detect a current position of the moving body; and
set the display mode to one of the transmissive mode or the non-transmissive mode based on the detected current position of the moving body.

8. The display control device mounted on the moving body according to claim 7, wherein the circuitry is further configured to:
acquire information associated with at least one of conditions inside the moving body, conditions outside the moving body, or a surrounding environment of the moving body; and
switch between the transmissive mode and the non-transmissive mode based on the at least one of the conditions inside the moving body, the conditions outside the moving body, or the surrounding environment of the moving body.

9. The display control device mounted on the moving body according to claim 7, wherein
the circuitry is further configured to switch between the transmissive mode and the non-transmissive mode based on the detected current position that is within a specific range from a user target position,
the user target position is based on one of a user input or user action history.

10. A display control method, comprising:
in a display control device mounted on a moving body:
receiving, by circuitry, an image of a landscape outside the moving body, wherein the image is captured by a camera;
detecting, by the circuitry, an object in the image of the landscape outside the moving body; and
controlling, by the circuitry, a display mode of a display screen based on the detected object, wherein an inner wall surface of the moving body comprises the display screen,
the display mode is one of a transmissive mode or a non-transmissive mode,
in the transmissive mode, the circuitry is further configured to control the display screen to display the image of the landscape outside the moving body, and
in the non-transmissive mode, the circuitry is further configured to control the display screen to display a content movie superimposed on one of at least a part of the display screen or on an entire inside area of the display screen.

11. A display control device mounted on a moving body, comprising:
circuitry configured to:
  detect a current position of the moving body;
  receive an image of a landscape outside the moving body, wherein the image is captured by a camera;
  detect an object in the image of the landscape outside the moving body; and
  switch a display mode of a display screen between a transmissive mode and a non-transmissive mode based on the detected object and the detected current position of the moving body, wherein
  the detected current position is within a specific range from a user target position,
  the user target position is based on one of a user input or user action history,
  an inner wall surface of the moving body comprises the display screen,
  in the transmissive mode, the circuitry is further configured to control the display screen to display the image of the landscape outside the moving body, and
  in the non-transmissive mode, the circuitry is further configured to control the display screen to display a content movie superimposed on one of at least a part of the display screen or on an entire inside area of the display screen.

\* \* \* \* \*